United States Patent [19]

Liebel

[11] Patent Number: 4,801,124
[45] Date of Patent: Jan. 31, 1989

[54] DISPOSABLE VALVE

[75] Inventor: Henry L. Liebel, Cincinnati, Ohio

[73] Assignee: Shippers Paper Products Company, Loveland, Ohio

[21] Appl. No.: 148,008

[22] Filed: Jan. 25, 1988

[51] Int. Cl.$^4$ ............................................. F16L 37/28
[52] U.S. Cl. ................................ 251/149.4; 251/353; 251/354; 137/625.38
[58] Field of Search .................... 251/149.4, 353, 354; 137/625.38

[56] References Cited

U.S. PATENT DOCUMENTS

| 1,087,713 | 2/1914 | Bolland | 251/149.4 |
| 2,692,112 | 10/1954 | Szitar, Jr. | 251/354 |
| 2,842,382 | 7/1958 | Fronk | 251/149.4 |

FOREIGN PATENT DOCUMENTS

| 598208 | 12/1925 | France | 251/149.4 |
| 107842 | 7/1917 | United Kingdom | 251/149.4 |
| 186710 | 10/1922 | United Kingdom | 251/149.4 |

Primary Examiner—A. Michael Chambers
Attorney, Agent, or Firm—Wood, Herron & Evans

[57] ABSTRACT

A disposable valve mounted to the wall and extending within the interior of containers such as disposable air bags or bulk containers includes a valve body having a hollow interior which receives a valve plug formed with a closure plate at one end and at least one fluid flow passageway. The valve plug is moved relative to the valve body by a fluid injector tip to an open position in which a portion of one or more fluid flow passageways in the valve plug extends exteriorly of the valve body and within the interior of the container to permit the passage of fluid therethrough, and then either in or out of the container. A resilient strap or band connected between the valve body and the flange of the valve plug, together with the pressure of the fluid inside of the container, forces the valve plug to a closed position upon removal of the fluid injector tip in which the fluid flow passageways in the valve plug are positioned interiorly of the valve body and an O-ring carried on the closure plate of the valve plug forms a seal between the valve plug and an end of the valve body.

12 Claims, 2 Drawing Sheets

DISPOSABLE VALVE

BACKGROUND OF THE INVENTION

A number of applications require the use of a valve which is simple in construction, effective in application and relatively easily and inexpensively produced. This is particularly true in applications where the product is disposable after a single use. For example, in the shipment of loads of material by truck or railway car, it is known to provide disposable paper air bags, which, in the uninflated condition, are inserted into voids in the load. The bags are then inflated with compressed air and expand to fill the voids so that the load is restrained against shifting during transit. When the shipment reaches its destination, the air bag is punctured and then removed from the void to permit removal of the material from the truck or railroad car. The bag is then discarded.

Since such bags are disposed of after a single use, it is desirable to provide an extremely inexpensive valve for disposal with the air bag which is simple in construction and easy to manufacture.

In other applications, such as in shipping containers containing a bulk load of material, e.g., a fluid adhesive, it is desirable to have a valve through which the material may be drained from the bulk container. The bulk container may be disposed of after use, and it is thus preferable to employ a valve which is inexpensive but reliable in operation.

SUMMARY OF THE INVENTION

To this end, there is provided a simply designed and constructed valve which may be formed of a relatively inexpensive material such as polyethylene. The valve is formed of a valve body, a valve plug movable within the valve body and a resilient retainer for securing the valve plug to the valve body. The valve body is tubular in shape and includes a flange extending radially outwardly from the wall of the valve body for mounting of the valve body to the article with which it is used, for example, in the wall of an air bag or in the wall of a bulk container.

In one embodiment, the valve plug includes a hollow tubular portion which is slidable within the inner diameter of the valve body. The hollow tubular portion of the valve plug is formed with an open end portion, and its opposite end is mounted to a closure plate having a flange which extends radially outwardly beyond the wall of the valve body. An O-ring or washer is carried on the outer surface of the valve plug at its flange which seals against an end edge of the valve body. A plurality of circumferential bores are formed in the tubular portion of the valve plug defining a fluid flow passageway extending from the open end portion of the valve plug, through its hollow tubular portion and then to such circumferential bores. The valve plug is movable relative to the valve body between an open position in which the circumferential bores are positioned exteriorly of the valve body, and a closed position in which the circumferential bores are positioned interiorly of the valve body and the O-ring carried by the valve plug seats against an end edge of the valve body to form a seal therebetween.

In a presently preferred embodiment, the valve plug comprises three fins, spaced 120° apart, which are connected at one end to a closure plate extending radially outwardly from the fins. An O-ring or washer is carried in a seat formed in the closure plate. The fins each have an inner edge connected to one another which extends longitudinally along the length of the valve plug, and a radially outwardly extending outer edge within the inner diameter of the valve body. The spaces between adjacent fins form fluid flow passageways which transmit fluid within the valve body between the closure plate at one end of the fins of the valve plug and the opposite end thereof. The valve plug is movable relative to the valve body between an open position in which the end of each fluid flow passageway adjacent the closure plate is positioned exteriorly of the valve body, and a closed position in which such ends of the fluid flow passageways are positioned interiorly of the valve body and the O-ring carried by the closure plate of the valve plug seats against an end edge of the valve body to form a seal therebetween.

A resilient retainer such as a rubberband retainer extends about the closure plate mounted at one end of the valve plug of either embodiment described above, and connects to retaining hooks formed on the outside wall of the valve body. The retainer urges the valve plug into the closed position against the valve body until the restraining force is overcome. In addition to this force applied to the valve plug by the retainer, the valve plug is held in a closed position by the fluid pressure within the interior of the container with which the valve is used. Preferably, the valve plug is designed such that its closure plate lies inside of the article with which it is used, e.g., interiorly of the air bag or bulk container. The force of the fluid contained in the article, be it the air pressure in an air bag or the fluid pressure in a bulk container, thus urges the valve plug toward the valve body to assist the resilient retainer in sealing the O-ring or washer therebetween.

An air bag employing the valve of this invention is filled by inserting an inflator tip attached to a source of compressed air into the valve body. In one embodiment of the valve plug, the tip engages the tubular portion of the valve plug at its open end, and this insertion force overcomes the retaining force of the retainer band to advance the valve plug inwardly until the circumferential bores in its tubular portion are brought out of the interior of the valve body. In the alternative embodiment of the valve plug, the inflator tip contacts the end of the fins opposite the closure plate and thus forces one end of the fluid flow passageways formed between adjacent fins out of the valve body. This movement of the valve plug relative to the valve body, in either embodiment of the valve plug herein, allows compressed air to flow through the fluid flow passageways in such valve plugs into the air bag.

Upon removal of the inflator tip on completion of the inflation, the force of the air in the bag along with the force of the retainer band forces the valve plug into the closed position wherein the fluid flow passageways of the valve plug are positioned within the interior of the valve body. Likewise, the O-ring is squeezed between the closure plate at one end of the of the valve plug, and the end edge of the valve body, to form a tight and complete seal thereat.

In a bulk container application, the container is filled from another opening, for example, at the top of the container, with the valve of the present invention being at the base of the container. The hydrodynamic force of the fluid contained in the container presses the closure plate at the end of the valve plug against the end edge of the valve body, thus holding the valve plug in the closed position. To remove fluid from the container, a drain plug is inserted into the valve body which pushes the valve plug, of either embodiment described above, inwardly into the container. This force moves the valve plug to the open position, partially out of the valve body, wherein the fluid can flow through the fluid flow passageway in the valve plug and out to the drain plug. Upon removal or release of the drain plug, the force of the fluid along with the force of the resilient retainer forces the valve plug to the closed position as explained above.

The valve of the present invention is thus of relatively simple design and is easily manufactured from relatively inexpensive plastic materials which can be discarded with the container after a single use.

DESCRIPTION OF THE DRAWINGS

The structure, operation ad advantages of the presently preferred embodiment of this invention will become further apparent upon consideration of the following description, taken in conjunction with the accompanying drawings, wherein.

DETAILED DESCRIPTION OF THE INVENTION

Figure 1:
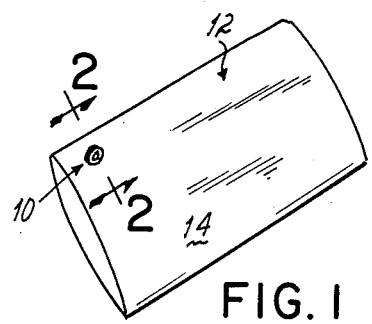
FIG. 1 is a perspective view of an air bag container incorporating one embodiment of the valve of this invention.

Referring now to FIGS. 1-3 and 7, one embodiment of the valve 10 of this invention is illustrated which is used with a container 12 having a wall 14 defining a hollow interior 16. The container 12 forms no part of this invention per se and may be of essentially any configuration or material, but it is contemplated that the container 12 is of the type which is disposable after a single use such as the paperboard air bags used in the shipment of material by truck or railway car.

The valve 10 comprises a valve body 18 having a cylindrical wall 20 defining a hollow interior 21. One end of the valve body 18 is formed with a radially outwardly extending projection 22 forming an annular shoulder 24. A mounting flange 26 is formed on the outer surface of cylinder wall 20 which is laterally spaced from the projection 22 forming a gap 28 between the flange 26 and the shoulder 24 of projection 22. The wall 14 of container 12 is received in the gap 28 between the shoulder 24 and flange 26, and the flange 26 is permanently affixed to the wall 14 by adhesives or any other suitable means of fastening. The opposite end of cylindrical wall 20 is formed with four hooks 30a–d which extend outwardly therefrom and are spaced at approximately 90° intervals about the circumference of valve body 20. See FIG. 7.

The valve body 18 is positioned with respect to the container 12 such that all of the cylindrical wall 20, except for the portion from the flange 26 to the projection 22, is disposed within the hollow interior 16 of container 12. In this position, the valve body 18 includes an outer end 32 disposed exteriorly of the container 12 and an inner end 34 disposed interiorly of the container 12.

A valve plug 36 is formed with a cylindrical wall 38 which is insertable within the hollow interior 21 of valve body 18. The valve plug 36 has a hollow interior which defines an internal, fluid flow passageway 40 extending between a first end 42 and a second end 44 of the valve plug 36. The first end 42 of valve plug 36 is open, and the second end 44 mounts a closure plate 46 at least a portion of which extends radially outwardly from the outer surface of the cylindrical wall 38 of valve plug 36, and beyond the cylindrical wall 20 of valve body 18, forming an annular flange 48. An O-ring 50 is carried on the outer surface of the cylindrical wall 38 of valve plug 36 against the flange 48. A plurality of circumferentially spaced slots or bores 52, three of which are shown in the Figs., are formed in the cylindrical wall 38 of valve plug 36 near its second end 44 and spaced from the closure plate 46.

Figure 2:
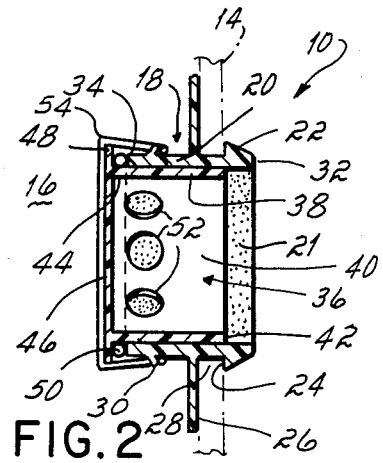
FIG. 2 is a cross-sectional view of the valve shown in FIG. 1, with the valve plug thereof in closed position, which is taken generally along line 2—2 of FIG. 1.
Figure 3:
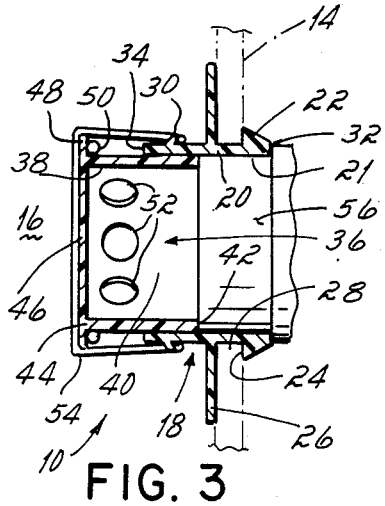
FIG. 3 is a view similar to FIG. 2 except with the valve plug in the extended, open position.

The valve plug 36 is movable within the interior 21 of valve body 18 between a closed position as shown in FIG. 2, and an open position as shown in FIG. 3. In the closed position, the O-ring 50 carried by the valve plug 36 creates a fluid tight seal between the inner end 34 of the valve body 18 and the flange 48 of valve plug 36, and the bores 52 formed in valve plug 36 are disposed within the hollow interior 21 of valve body 18. This creates a fluid-tight seal between the valve body 18 and valve plug 36 to prevent the flow of fluid either in or out of the container 12.

Figure 7:
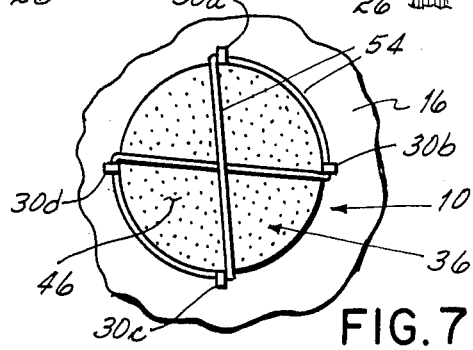
FIG. 7 is an end view of the valves shown in the Figs. illustrating the resilient retainer for the valve plug.

In the presently preferred embodiment, the valve plug 36 is urged into the closed position by a resilient retainer or band 54 such as a rubberband or other resilient, elastomeric strap. As shown in FIG. 7, the resilient band 54 is connected in an X-shape between the four hooks 30a–d on the valve body 18 and extends over the exterior surface of the closure plate 46 of valve plug 36. The force exerted on the valve plug 36 by the band 54, and the internal pressure of any fluid within container 12, maintain the valve plug 36 in the closed position relative to valve body 18 so that fluid cannot escape or enter the container 12 through the valve 10.

As shown in FIG. 3, the valve plug 36 is movable to an open position relative to valve body 18 for the filling or removal of fluid from the interior 16 of container 12. An injector tip 56 is inserted through the outer end 32 of valve body 18 into engagement with the first end 42 of the valve plug 36. The injector tip 56 is advanced laterally into the valve body 18, toward the interior of container 12, to move the valve plug 36 further into the interior 16 of container 12. As the valve plug 36 moves inwardly, the circumferential bores 52 in the valve plug 36 extend outwardly from the interior 21 of valve body 18 and the O-ring 50 disengages the inner end 34 of valve body 18. This provides a fluid path from the interior 16 of container 12 through the bores 52 and into the internal passageway 40 of valve plug 36 for the escape of fluid from the container 12. Alternatively, fluid can be injected in the opposite direction through the tip 56, into the internal passageway 40 of valve plug 36 and then through its bores 52 into the interior 16 of container 12. Upon removal of the injector tip 56, the force of the resilient band 54, coupled with the fluid pressure of the air within container 12, urges the valve plug 36 back to the closed position shown in FIG. 2 to seal the container 12.

Figure 4:
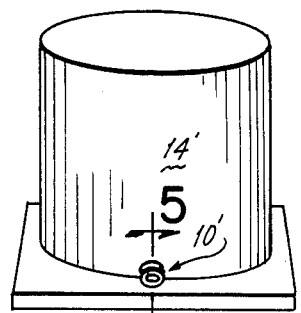
FIG. 4 is a front view of the valve herein having a slightly modified valve body, which is adapted for use with a bulk container.
Figure 5:
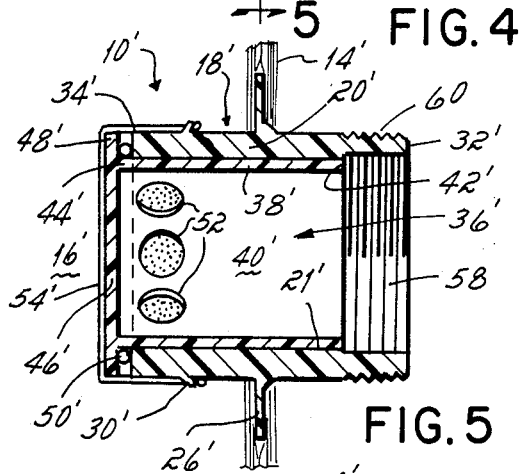
FIG. 5 is a cross-sectional view of the valve shown in FIG. 4, with the valve plug in the closed position, which is taken generally along line 5—5 of FIG. 4.
Figure 6:
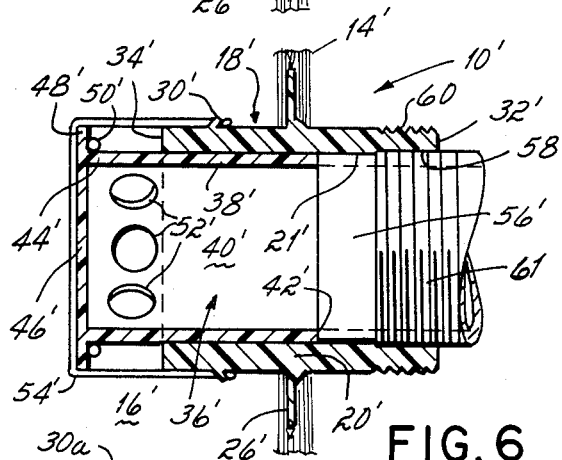
FIG. 6 is a view of the valve in FIG. 5 with the valve plug in the open position.

Referring now to FIGS. 4–6, a valve 10' is illustrated which is a variation of the valve 10 illustrated in FIGS. 2 and 3. The reference numbers used in describing FIGS. 2 and 3 are applied to like structure in FIGS. 5 and 6 with the addition of a prime to the corresponding numbers.

The valve 10' differs from valve 10 in essentially two respects. The flange 26' of valve body 18' is mounted within the wall 14' of container 12' instead of attaching to the inner or outer surface thereof. It is contemplated that the container 12' would be used in applications for the transport of material in bulk, and is of the type formed of a plurality of individual, thin sheets of paper or similar material which are laminated together in layers to form the wall 14' of container 12'. In the course of forming the laminated wall 14' of container 12', the flange 26' of valve body 18 is inserted into the wall 14' and the fabrication process is thereafter completed to imbed the valve body 18' within the container wall 14'.

In the embodiment of FIGS. 4–6, the outer end 32' of valve body 18' is formed with both internal threads 58 and external threads 60 which are adapted to receive an injector tip 56' having mating threads 61. In order to move the valve plug 36' between the open and closed position, the injector tip 56' is threaded onto the valve body 18' and into engagement with the first end 42' of valve plug 36'. Otherwise, the structure and function of the valve assembly 10' is identical to that described above for valve assembly 10.

Figures 8, 9:
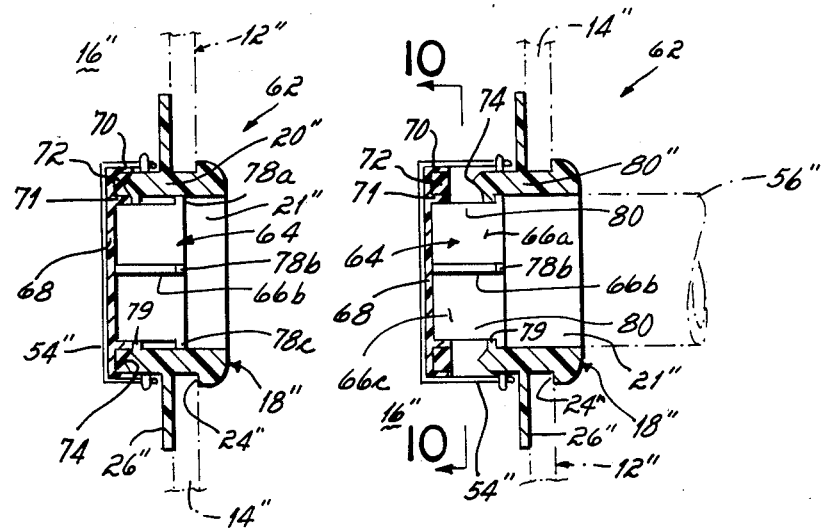
FIG. 8 is a cross sectional view of an alternative embodiment of the valve herein having a modified valve plug shown in the closed position.
FIG. 9 is a view similar to FIG. 8 with the valve plug in an open position.
Figure 10:
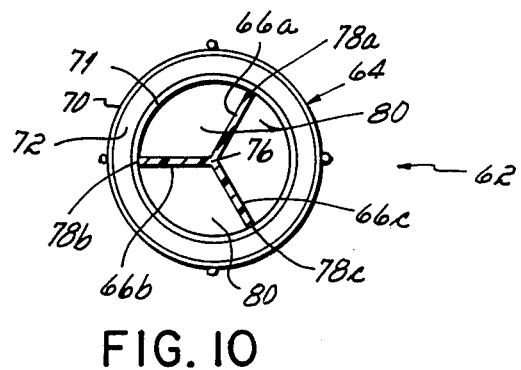
FIG. 10 is a cross sectional view taken on line 10—10 of FIG. 9.

Referring now to FIGS. 8–10, an alternative embodiment of a valve 62 of this invention is illustrated. The valve 62 is formed with a valve body 18" which is substantially identical to the valve body 18 illustrated in FIGS. 1–3 as described above. The same reference numbers are therefore used in the description of valve structure common to valves 10 and 62, with the addition of a double prime to the numbers in FIGS. 8–10.

The valve 62 employs a different valve plug 64 from that employed in valve 10 described above, and this valve plug 64 comprises three fins 66a–c, spaced approximately 120° apart, which are connected at one end to a closure plate 68 extending radially outwardly from the fins 66a–c. The closure plate 68 is formed with an outer lip 70 and an inner ring 71 which are spaced from one another to form a seat which mounts an O-ring 72. The O-ring 72 is positioned on closure plate 68 to seat against the end edge 74 of the valve body 18".

The fins 66a–c each have an inner edge connected to one another at a center section 76 of the valve plug 64 which is colinear with the longitudinal axis of the valve plug 64. The fins 66a–c extend radially outwardly from the center section 76 and terminate in tangs 78a–c, respectively, which in the fully open position shown in FIG. 9 contact an inner flange 79 of the cylindrical wall 20" of valve body 18" to limit movement of the valve plug 64 with respect to the valve body 18". Three fluid flow passageways 80 are formed in the spaces between adjacent fins 66a–c to permit the flow of fluid between the end of fins 66a–c adjacent closure plate 68 and their opposite end.

The valve plug 64 is movable within the interior 21" of valve body 18" between a closed position as shown in FIG. 8, and an open position as shown in FIG. 9. In the closed position, the O-ring 72 carried by the seat formed in closure plate 68 creates a fluid-tight seal between the end edge 74 of valve body 18" and the closure plate 68. The closure plate 68 is maintained in engagement with end edge 74 of valve body 18" by the resilient band 54", as also shown in FIG. 7, and the internal pressure of the fluid contained within the container 12" in the same manner as discussed above in the embodiment of FIGS. 1–3.

As shown in FIG. 9, the valve plug 64 is movable to an open position relative to valve body 18" for the filling or removal of fluid from the interior 16" of container 12". An injector tip 56" is brought into engagement with the end of fins 66a–c opposite closure plate 68. The injector tip 56" is advanced laterally into the valve body 18", toward the interior of container 12", to move the valve plug 64 further into the interior 16" of the container 12". As the valve plug 64 moves inwardly, the ends of the passageways 80 adjacent the closure plate 68 are extended outwardly from the interior 21" of valve body 18", and the O-ring 72 carried by closure plate 68 disengages the end edge 74" of valve body 18. This provides a fluid path along each of the three passageways 80 between adjacent fins 66a–c allowing fluid to flow from the interior 16" of container 12" through the passageways 80 of valve plug 64 and out of the container 12". Alternatively, fluid can be injected in the opposite direction through the tip 56", into the three passageways 80 of valve plug 64 past the unseated closure plate 68 and into the interior 16" of container 12". The containing of tangs 78a–c with the inner flange 79 of the valve body 18" limits outward movement of the valve plug 64, as shown in FIG. 9. Upon removal of the injector tip 56", the force of the resilient band 54", coupled with the fluid pressure of the fluid within container 12", urges the valve plug 64 back to the closed position as shown in FIG. 8 to seal the container 12".

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the embodiment of the valve plug 64 illustrated in FIGS. 8–10 has three fins 66a–c spaced 120° apart forming three fluid flow passageways 80. It is contemplated, however, that the valve plug 64 could be formed with more than three fins, or, alternatively, as a single fin with outer edges which extend to the inner surface of the interior of the valve body 18 so as to form a fluid flow passageway on either side thereof. In addition, the valve 62 illustrated in FIGS. 8–10 could be formed with a partially threaded outer wall, as in the valve 10' of FIGS. 4–6, for use in a container 14' with an inflator tip 56'.

Therefore, it is intended that the invention not be limited to the particular embodiment disclosed as the best mode contemplated for carrying out this invention, but that the invention will include all embodiments falling within the scope of the appended claims.

I claim:

1. A valve comprising:
   a valve body formed with a hollow interior, said valve body being adapted to mount to the wall of a hollow container;
   a valve plug formed with at least one fluid flow passageway having a first end and a second end, said valve plug being movable within said hollow interior of said valve body between an open position in which one of said first and second ends of said fluid flow passageway in said valve plug extends outwardly from said valve body and into the hollow container, and a closed position in which said first and second ends of said fluid flow passageway of said valve plug extend within said hollow interior of said valve body;
   sealing means carried by one of said valve plug and said valve body for sealing said fluid flow passageway in said valve plug from the interior of the hollow container with said valve plug in said closed position;
   a resilient band connected between said valve plug and said valve body for forcing said valve plug into said closed position relative to said valve body; and
   means circumferentially spaced on the exterior surface of one end of said valve body connecting said resilient band to said valve body, said means connecting said resilient band to said valve body comprises a plurality of circumferentially spaced hooks, said resilient band being connected between said hooks and the exterior surface of one end of said valve plug.

2. The valve of claim 1 in which valve body is cylindrical in shape, said valve body being formed with a flange adapted to mount to the inner surface of the wall of the hollow container.

3. The valve of claim 1 in which said valve plug has a cylindrical wall, said cylindrical wall defining said fluid flow passageway.

4. The valve of claim 3 in which said outlet in said fluid flow passageway comprises a plurality of circumferentially spaced openings formed in said cylindrical wall of said valve plug.

5. The valve of claim 1 in which said valve plug is formed with a cylindrical wall and a closure plate mounted at one end of said cylindrical wall, a portion of said closure plate extending radially outwardly from said cylindrical wall to form an annular flange.

6. The valve of claim 5 in which said sealing means is an O-ring or washer positioned against said annular flange of said valve plug, said O-ring or washer being engageable with one end of said valve body with said valve plug in said closed position to create a fluid-tight seal therebetween.

7. The valve of claim 1 in which said hollow interior of said valve body defines a cylindrical wall having an inner surface and an outer surface, at least a portion of said inner surface of said cylindrical wall being threaded to receive a fluid injector having mating threads, said fluid injector being adapted to be threaded into said valve body and engage an end of said valve plug to move said valve plug into said open position.

8. The valve of claim 1 in which said valve plug comprises at least one fin having opposed outer edges which extend to the inner surface of said hollow interior of said valve body, said fin forming at least one fluid flow passageway within said valve body for transmitting fluid into or out of the hollow container.

9. The valve of claim 1 in which said valve plug comprises three fins each having an inner edge and an outer edge extending radially outwardly from said inner edge, said inner edges being interconnected and said outer edges being spaced at an angle of about 120° relative to one another forming three fluid flow passageways between adjacent fins.

10. The valve of claim 9 in which said valve body has an end edge extending within the interior of the hollow container, said valve plug having a closure plate mounted at one end of said fins, said closure plate carrying said sealing means for engagement with said end edge of said valve body with said valve plug in said closed position to seal said fluid flow passageways of said valve plug from the interior of the container, and said closure plate being spaced from said end edge of said valve body with said valve plug in said open position to connect said fluid flow passageways to the interior of the container.

11. The valve of claim 10 in which said flange is formed with a lip and an annular ring spaced from said lip, said sealing means comprising an O-ring seal mounted between said lip and said annular ring which seats against said end edge of said valve body with said valve plug in said closed position.

12. A disposable valve comprising:
    a tubular plastic valve body having a first and a second end and a fluid flow passage therebetween, a first flange extending inwardly from the wall of said valve body and a second flange extending outwardly from the wall of the valve body and adapted to be secured in the wall of a container to mount the valve for filling or unfilling of the container therethrough,
    a plastic valve plug including a circular closure plate, a plurality of fins extending perpendicularly from the plane of said closure plate, and seal means for forming a fluid seal between said closure plate and said first end of said valve body,
    said valve plug being movable with respect to said valve body between a fully opened position in which said closure plate and seal means are spaced from said first end of said valve body permitting flow of a fluid through said fluid flow passage and around the edge of said closure plate, and a closed position in which said seal means seats on said first end of said valve body preventing fluid flow through said fluid flow passage,
    said fins including tangs at the end remote from said closure plate operative to engage said first flange of said valve body to limit movement of said valve plug in said fully opened position, and
    resilient retainer means connected between said valve body and said valve plug biasing said valve plug to the closed position.

* * * * *